Dec. 28, 1943.  T. BROWN  2,337,638
POWER LIFT
Filed Aug. 8, 1942  4 Sheets-Sheet 1

Inventor
THEOPHILUS BROWN

Attorneys

Dec. 28, 1943.   T. BROWN   2,337,638
POWER LIFT
Filed Aug. 8, 1942   4 Sheets-Sheet 3

FIG. 4

INVENTOR
Theophilus Brown
BY
ATTORNEYS

Dec. 28, 1943. T. BROWN 2,337,638
POWER LIFT
Filed Aug. 8, 1942 4 Sheets-Sheet 4

INVENTOR
Theophilus Brown

Patented Dec. 28, 1943

2,337,638

UNITED STATES PATENT OFFICE 2,337,638

POWER LIFT

Theophilus Brown, Moline, Ill., assignor to Deere & Company, Moline, Ill., a corporation of Illinois Application August 8, 1942, Serial No. 454,173

50 Claims. (Cl. 97—50)

This application is a continuation-in-part of my co-pending application, Serial No. 419,428, filed November 17, 1941.

The present invention relates generally to power lift mechanisms for agricultural tractors and the like, and is more particularly concerned with new and useful improvements in hydraulically operated power lift apparatus carried by a farm tractor and driven by the tractor motor. Tractor-actuated power lift mechanisms are usually employed in connection with various implement parts and/or tools for lifting, raising or otherwise controlling them by power derived from the tractor.

The object and general nature of the present invention is the provision of a power lift mechanism wherein one cylinder and piston unit, or ram unit, may be utilized for actuating both of a pair of implement controlling parts, with a supplemental control, including at least one additional ram unit, also deriving power from the tractor.

More specifically, it is a feature of the present invention to provide a power lift mechanism wherein one ram unit may be utilized for actuating both of a pair of implement controlling parts and either of two separate individually operable units may be optionally controlled for effecting a further individual control. It is a further feature of this invention to provide, in connection with a first power lift unit for operating two implement controlling parts, a pair of separately operable units, preferably hydraulically operated, which serve as means limiting the movement of either of the implement controlling members in its return direction. Further, it is another feature of this invention to provide biased valve controlling means for said individual units whereby either of said individual units may be operated independently of the main power lift mechanism.

An additional feature of this invention is the provision of a power lift mechanism wherein one ram unit may be optionally connected either to raise a pair of implement parts or one of them, with an auxiliary ram unit optionally connectible to actuate the other implement controlling part. More specifically, it is a feature of this invention to provide a power lift mechanism especially constructed for use with tractor mounted cultivators, in which a pair of separate ram units may be employed for effecting an individual control of the cultivators, or one ram unit may be disconnected and the two tools or tool operating parts connected to the other ram unit so that the latter operates both of the tool controlling parts at the same time.

Further, it is a feature of this invention to provide an arrangement wherein the controlling valve lever for the main ram unit is shiftable to connect or disconnect the auxiliary ram unit. It is also a feature of this invention to provide an auxiliary ram unit with automatic mechanism for returning the control lever for the auxiliary ram unit to its neutral position when the ram unit has been extended a predetermined amount, which can be adjusted.

These and other objects and advantages of the present invention will be apparent to those skilled in the art after a consideration of the following detailed description, taken in conjunction with the accompanying drawings in which the preferred forms of the invention have been illustrated.

Figures 1, 1A:
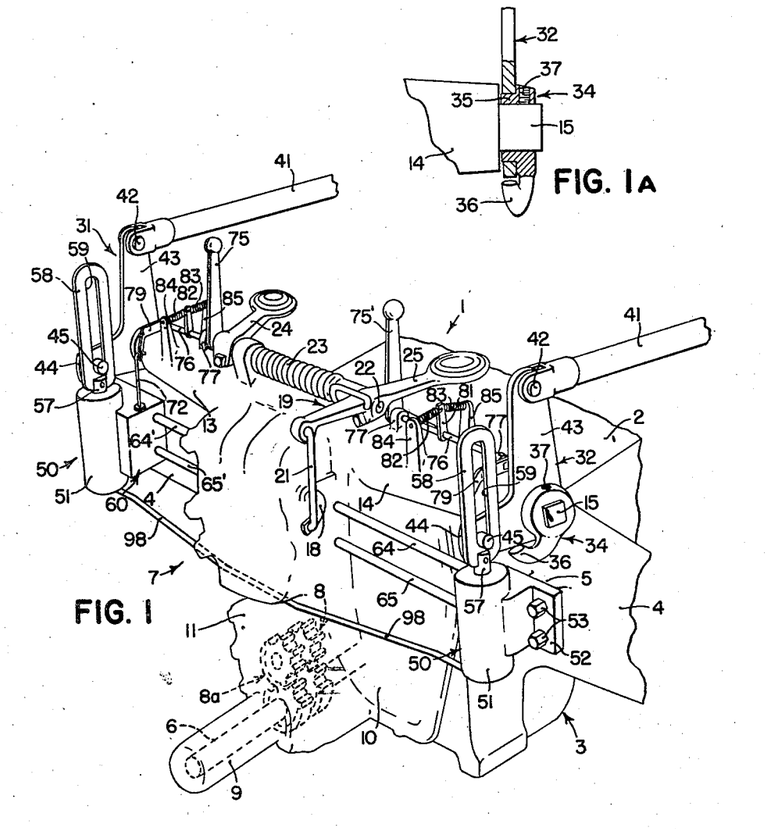
Figure 1 is a perspective view of the rear portion of a tractor in which power lift mechanism constructed according to the principles of the present invention has been incorporated.
Figure 1A is a fragmentary sectional view showing the manner of connecting one of the implement controlling members with the transverse rock shaft of the main power lift mechanism.
Figure 2:
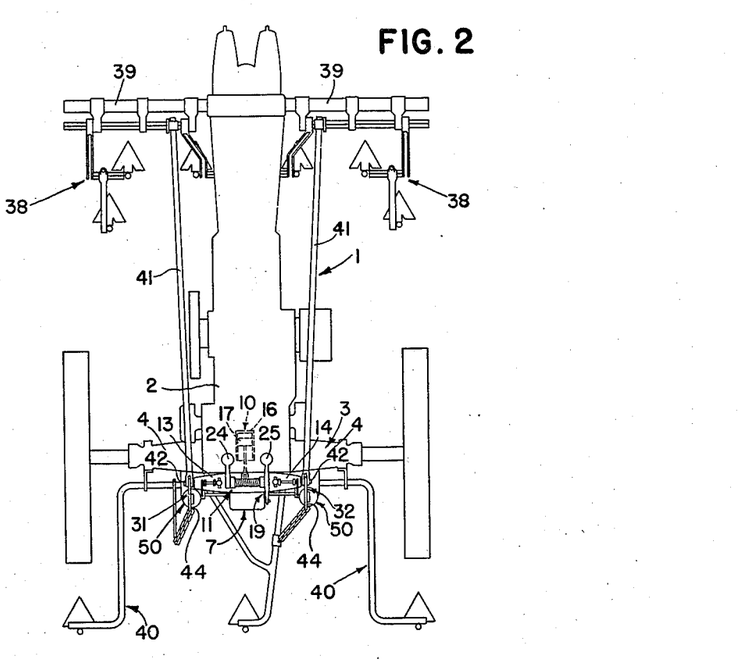
Figure 2 is a plan view of a tractor having power lift mechanism incorporating the present invention and arranged to control the front and rear rigs of a tractor-mounted cultivator.
Figure 3:
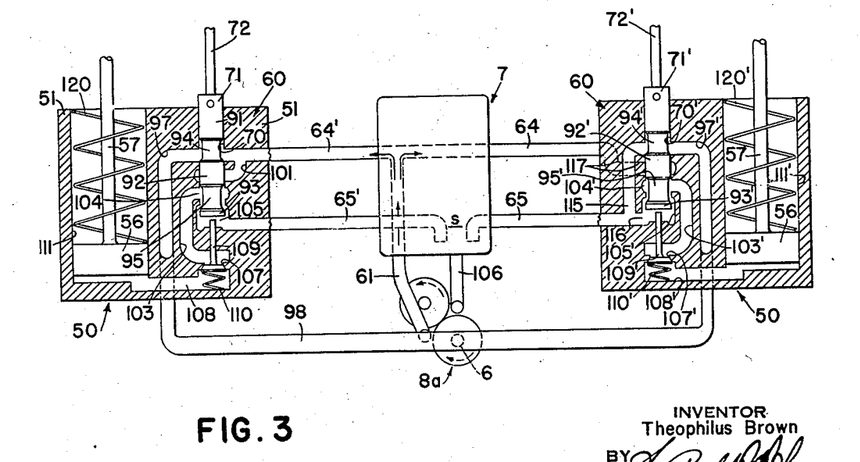
Figure 3 is a schematic diagram illustrating one way of effecting a hydraulic control for the individual power operated auxiliary units.

Referring now to the first form of the present invention, shown in Figures 1–3, the reference numeral 1 indicates a farm tractor which comprises a combined crank case and supporting structure 2 to which a rear axle housing 3 is secured. The rear axle housing 3 includes laterally directed housing sections 4 each of which is formed with an attaching boss 5, adapted to receive implements and other parts as desired. A hydraulic mechanism, indicated in its entirety by the reference numeral 7, is bolted over the rear opening of the axle housing 3 and preferably is of substantially the same construction as shown and claimed in United States Patent No. 2,107,760, issued February 8, 1938, to E. McCormick et al., to which reference may be had if desired. Briefly, the hydraulic mechanism 7 includes a pump unit 8, serving as a source of fluid pressure, driven by suitable connections to the power take-off shaft 6 extending rearwardly from the rear axle housing and enclosed in a protecting tube 9. Preferably, the pump 8 is of the gear type and is enclosed within a housing 11 which forms a part of the hydraulic power unit 7. The upper part of the housing 11 is formed with lateral extensions 13 and 14 in which a transverse rock shaft 15 is mounted for rocking movement. Disposed within the housing 11 is a piston and cylinder unit 10 (Figure 2) operatively connected with the rock shaft 15 for moving the same from one position to another, substantially as disclosed in said prior patent, and which, as best shown in Figure 2, includes a cylinder 16 and a piston 17 connected by a link 20 with an arm on the shaft 15. Preferably, the outer ends of the rock shaft 15 are squared, and the rocking of the shaft 15 is under the control of valve mechanism that is actuated by a crank arm 18 (Figure 1) extending laterally outwardly of the upper portion of the housing 11. A trip lever 19 is mounted by suitable supports on the upper part of the housing 11 and is connected by a link 21 with the valve arm 18. The trip lever 19 is secured to a rock shaft 22 about which a spring 23 is disposed. The left end of the shaft 22 carries a foot pedal 24, and the trip lever 19 is also formed with a second foot pedal 25. The spring 23 normally biases the trip lever 19 to take the position shown in Figure 1, and the valve mechanism is so constructed and arranged that in this position the rock shaft 15 is permitted to rock in a counterclockwise direction, as viewed from the right side of the machine, to its limit of movement. Stepping on either of the foot pedals 24 and 25 actuates the valve mechanism to cause the rock shaft to be rocked in a clockwise direction, this being the raising movement of the rock shaft. Stepping on either of the foot pedals 24 and 25 a second time permits the rock shaft 15 to return to its original position.

According to the principles of the present invention, a pair of bell cranks 31 and 32 are mounted loosely on the ends of the rock shaft 15, and to this end I provide a pair of rock shaft arms 34 each of which, as best shown in Figure 1A, is provided with a hub section 35 on which the associated bell crank is mounted for rocking movement. Each arm member 34 is provided with an extension 36 that is adapted to engage one of the arms of the associated bell crank whereby rocking movement of the rock shaft 15 in one direction causes the extensions 36 of the two lifting arms 34 to engage the associated bell cranks 31 and 32 so as to rock the bell cranks with the rock shaft 15. Any suitable means, such as a set screw 37, may be utilized for fixing each of the lifting arms 34 to the associated end of the rock shaft 15.

For purposes of illustration, I have shown in Figures 1 and 2 a tractor-mounted cultivator of generally conventional construction, so far as the present invention is concerned, as one form of implement which may be controlled by the power lift of my invention. The cultivator construction is in general similar to the tractor mounted implement shown in the U. S. Patent No. 2,033,380, issued March 10, 1936, to Theodore W. Johnson. Right and left hand sets of front rigs 38 are connected for generally vertical swinging movement by link means to right and left hand draft beams 39 secured to the tractor. Rear rigs 40 are connected for vertical swinging to the rear axle extensions 4 by brackets or the like. A pair of cultivator lift members 41, preferably pipes or tubular members, are connected, as by pivot pins 42, to the upwardly extending arm 43 of the power lift bell cranks 31 and 32 (Figure 1). The bell cranks also have rearwardly extending arms 44 which carry studs 45. Each of the bell cranks 31 and 32 is mounted for rocking movement on the ends of the rock shaft 15 by the means shown in Figure 1A and described above. The lifting extension 36 of each lifting arm 34 contacts the rearwardly extending bell crank arm 44, as best shown in Figure 1. The front ends of the cultivator lift pipes 41 are connected to arms 46 fixed to shafts 47 on the draft beams, and the shafts 47 are connected to raise the front rigs 38 when the lift members or push pipes 41 are moved forwardly. At the rear of the tractor the rear arms 44 are extended, as at 44a, and connected by chains 48 or the like with the rear rigs 40 when the bell cranks 31 and 32 are rocked forwardly.

A pair of auxiliary hydraulic units, each indicated in its entirety by the reference numeral 50 in Figure 1, is mounted on the rear axle 3. To this end, each of the auxiliary hydraulic units includes a casing 51 having a lateral extension 52 apertured to receive attaching studs 53 that are threaded into tapped openings in the rear axle attaching pads or bosses 5. The two housings 51 are substantially identical except that one is a right-hand unit and the other is a left-hand unit, and each is formed with a cylinder disposed generally vertically in which a piston moves, there being a piston rod 57 connected to each piston as in conventional construction. In Figure 3, the piston is indicated by the reference numeral 56. Each housing 51 also includes a valve chamber indicated in its entirety by the reference numeral 60, in which suitable valve mechanism is provided.

In this form of the invention the hydraulic units 50 are substantially identical, except for slight differences in the oil passages. The present invention is not concerned with the particular details of the valve controls as such, and hence it will not be necessary to show all of the parts of the valve controls. From Figure 1 it will be seen that I have provided the tractor 1 with an auxiliary pump 8a which is arranged to discharge fluid under pressure through an auxiliary high pressure conduit 61 (Figure 3) leading upwardly into and through the main hydraulic unit 7, communicating with a right hand passage 64 and a left hand passage 64', the high pressure passages 64 and 64' extending from the housing of the hydraulic unit 7 laterally outwardly, respectively, to the right and left hand auxiliary units 50, as best shown in Figure 1. Also extending between the main power lift mechanism 7 and the auxiliary units 50 are a pair of right and left hand low pressure passages 65 and 65' to which more detailed reference will be made below.

Considering first the left hand auxiliary unit 50, the high pressure passage 64' communicates with a generally vertical valve bore 70 in which a valve 71 is vertically movable. A stem or operating rod 72 extends upwardly from the valve 71 for connection with operating means which, as best shown in Figure 1, includes a valve lever 75. This lever is fixed to a shaft 76 that is supported, as by brackets 77, on the rock shaft housing extension at that side of the tractor. A valve operating arm 79 is fixed to each rock shaft 76 and has its outer end connected with the associated valve operating rod 72. An arm 81 is fixed to each of the rock shafts 76 and is connected to a pair of springs 82 and 83, the outer ends of which are anchored to lugs 84 and 85 carried by the rock shaft housing extension. The purpose of the two springs 82 and 83 is to hold the associated valve member 71 in neutral position, which is the position shown in Figure 3.

Referring again to Figure 3, it will be seen that the valve 71 includes an upper cylindrical section 91 closing the upper end of the valve bore 70, an intermediate cylindrical section 92 and a lower cylindrical section 93, connected together by neck or shank sections 94 and 95. A passage 97 communicates with the high pressure passage 64 around the narrowed neck section 94, when the valve 71 is in the position shown in Figure 3, the neutral position, and the passage 97 at its lower end is connected by a tube 98 to a high pressure passage in the right hand unit 50, to which detailed reference will be made later. A branch high pressure passage 101 leads into the space just below the high pressure passages 64' and 97 but, when the valve 71 is in its neutral position, is closed off by the intermediate cylindrical section 92. A branch passage 103 is connected at its upper end with the space 104 surrounding the lower neck section 95 of the valve 71 and opens into communication with the low pressure chamber 105 when the valve 71 is in its neutral position with the lower cylindrical portion 93 below the lower end of the valve bore 70. The low pressure chamber 105 communicates with the low pressure passage 65' which leads into the sump or reservoirs of the main hydraulic power lift unit 7. Through a connection 106 the auxiliary pump 8a is adapted to draw liquid from the reservoir. At its lower end the branch passage 103 communicates through a valve controlled opening 107 with a discharge passage 108. The opening 107 is normally closed by a check valve 109 held in its upper or closed position by a spring 110. The discharge passage 108 leads into communication with the lower end of a cylinder 111 which is formed in or as a part of the casing 51 of the left hand unit. The piston 56 is movable vertically in the cylinder 111.

The right hand unit 50 is of substantially the same construction as has just been described, and therefore corresponding parts in the right hand unit will be indicated by the same reference numerals, primed to maintain a distinction between the two units. The transverse tube 98 connects with the lower end of the high pressure passage 97' in the unit 50', and when the valve 71' is in its neutral position, as shown in Figure 3, the passage 97' communicates around the narrow neck section 94' of the valve 71' with a passage 115 that leads into communication with the low pressure duct 65, that extends from the right hand unit 50 back to the sump or reservoir of the unit 70. Also, the lower end of the valve bore 70' communicates with the low pressure passage 65, as indicated at 116. Just below the upper horizontal portion of the passage 115 and the passage 97' is a passage 117 that communicates with the high pressure passage 64. A branch passage 103' communicates at its upper end with the portion 104' of the valve bore 70' surrounding the narrow shank section 95', and the lower end of the branch passage 103' communicates through a valve controlled opening 107' with a discharge passage 108' that opens into communication with the lower end of the cylinder 111' in which the piston 56' is movable.

The operation of each of the auxiliary units 50, so far as the valves are concerned, will be clear from Figure 3. When it is desired to raise the left hand piston 56, the operator swings the lever 75 (Figure 1) forwardly, which raises the valve 71 upwardly, through the arm 79 and the link 72. When the cylindrical section 92 of the valve 71 closes the communication between the passage 64' and the passage 97, fluid under pressure is directed into the passage 101, and since the lower edge of the cylindrical section 92 is above the lower margin of the passage 101, oil or other fluid under pressure flows from the passage 101 into the chamber 104 and then through the branch passage 103 and the opening 107 past the valve 109 into the discharge passage 108, thus entering the lower end of the cylinder 111 and raising the piston 56. When the latter has been raised the desired amount, the operator releases the handle 75, either manually returning it to a neutral position or permitting the springs 82 and 83 to return the handle 75 to a neutral position. This shifts the cylindrical section 92 of the valve 71 back to the position shown in Figure 3, in which the oil flows from the high pressure passage 64 around through the passage 97 and the tube 98 and into the passage 97', from which point the fluid flows around the shank section 94' of the right hand valve 71' and then down through the passage 115 and through the passage 65 back to the reservoir. The spring 110 closes the valve 107 and thereby locks the fluid in the lower end of the cylinder 111 and thus holds the piston rod 57 in the desired position.

The right hand unit 50' may be similarly operated. With the left hand valve 71 in its neutral position, as shown in Figure 3, the left hand piston 56' may be forced upwardly by the operator swinging the right hand lever 75' (Figure 1) forwardly, which will raise the valve 71' and cause the central cylindrical section 92' to close off communication between the passage 97' and the low pressure return passage 115. When the lower edge of the cylindrical section 92' opens the passage 117, oil under pressure flows through the passage 64, and into the valve bore 70' through the passage 117. The oil then flows through the chamber 104' and the branch passage 103' into the right hand discharge passage 108' through the valve controlled opening 107'. Thus, the right hand piston is extended, and the movement of the piston 56' in an upward direction may be terminated at any point desired, merely by returning the valve handle 75' to a neutral position, which lowers the right hand valve 71' and thus closes off communication between the high pressure passages 64 and 117 and the chamber 104' and opens communication between the high pressure passage 97' and the return passages 115 and 65.

When the farmer desires to raise both of the cultivator rigs associated with the push pipes 41, he steps on either of the foot pedals 24 and 25, which actuates the power lift mechanism 7 and causes the rockshaft 15 to rock in a clockwise direction, thereby swinging both of the bell cranks 31 and 32 in that direction and pushing forwardly on both of the push pipes 41. When the farmer desires to lower both of the cultivator rigs, he again steps on either of the foot pedals 24 and 25, and the weight of the cultivator rigs causes them to move downwardly, the push pipes 41 moving rearwardly and both of the bell cranks 31 and 32 swinging in a counterclockwise direction. The amount of swinging movement of the bell cranks 31 and 32 in this direction is determined by the positions of the piston rods 57 of the hydraulic auxiliary units 50, since each piston 56 and 56' will be hydraulically locked in the position to which it has been moved, as described above, each piston being held against downward movement by the associated check valve, 107 or 107'. That is, each bell crank swings in a counterclockwise direction until the stud 45 engages the bottom of the slot 59 in the associated link 58. In other words, the auxiliary hydraulic units 50 serve as individual stops for separately controlling the lowered or return position of the two bell cranks 31 and 32. Considering these auxiliary units as stops, they are adjustable, both when the bell cranks are rocked in a clockwise direction to raise the cultivator rigs and when the rigs are in their lowered position, with the pins 45 resting in the bottoms of the slots 59. To adjust the lowered position of either rig, all that the operator has to do is to move the valve lever 75 or 75' of the associated auxiliary hydraulic unit in a rearward direction. Assuming that the left hand lever 75 has been moved rearwardly, it will be seen from Figure 3 that the corresponding downward movement of the valve 71 will cause the lower end of the latter to engage the stem of the valve 109, whereby the downward movement of the valve 71' moves the check valve 109 into an open position, which permits oil to flow from the discharge passage 108 upwardly through the opening 107 past the open valve 109 and through the passage 103 into the chamber 104, and from there the oil flows to the reservoir through the low pressure passage 65'. In a similar way, the right hand piston 56 may be lowered by moving the valve 71' downwardly to open the check valve 109'. It will be understood that the weight of the cultivators or other tools will act through the associated bell cranks to force the pistons 56 or 56' downwardly, but in those cases where the weight of the tools is not available or it is not convenient to employ the same, springs 120 and 120' may be associated with the pistons 56 and 56' for returning them to their lower position when the associated check valve is open. The operator may also desire, when the tools are in operating position and with their lowered position determined by the positions of the piston rods 57 and 57', to raise the tools slightly or to raise one of them slightly. In that case all that it is necessary to do is to move the valve handle, 75 or 75', forwardly until the associated valve 71 or 71' is lowered an amount sufficient to direct a quantity of fluid into the associated piston. By momentarily moving the hand levers forwardly and then returning them to neutral, relatively small increments of raising movement may be effected. Similarly, relatively small increases in the operating position of the cultivators or other tools may be effected by momentarily moving the levers 75 and 75' rearwardly and then returning them almost immediately to their neutral position.

Ordinarily, all that the farmer has to do to return the valve levers 75 and 75' to their neutral position is to release them, since the springs 82 and 83 act to hold the valve levers in neutral position.

It will be noted that the two auxiliary hydraulic units 50 serve as independent means separately controlling the bell cranks 31 and 32. Also, it will be noted that the hydraulic units 50 may be utilized as means for raising both of the cultivator rigs instead of the tractor power life mechanism 7, and this may be done by moving both of the valve levers 75 and 75' forwardly. Moreover, the tractor power lift mechanism 7 may be actuated to swing both of the bell cranks 31 and 32 forwardly, and then, if it should be desired subsequently to lower only one of the cultivator rigs, the hydraulic unit 50 associated with the other rig may be actuated by moving its valve lever 75 or 75' forwardly to raise the piston rod 57 or 57' of that unit through its full extent, whereby when the hydraulic power lift unit 7 is operated to permit the rockshaft 15 to rock rearwardly, only the other cultivator until will be lowered, and its position will be determined by the position of the other auxiliary hydraulic unit 50. Then, the first cultivator rig may subsequently be lowered by moving the valve lever 75 or 75' of the associated auxiliary hydraulic unit rearwardly, thus permitting the rig to lower to the desired point. From this it will be seen that the present invention is admirably adapted to secure what is termed a delayed lift control for cultivator rigs or other tools, which is an advantage when operating on point rows. The provision of the auxiliary hydraulic units also makes it possible for the farmer to raise the cultivator rigs or other tools as slowly as desired, as by opening the valves only a small amount. It will be understood, of course, that the present invention is not necessarily limited to the control of cultivator rigs, since any other tools that may be connected with the bell cranks 31 and 32 may be controlled in a similar manner. For example, two-way plows may be mounted on the tractor and controlled individually by the auxiliary hydraulic units 50.

Figure 4:
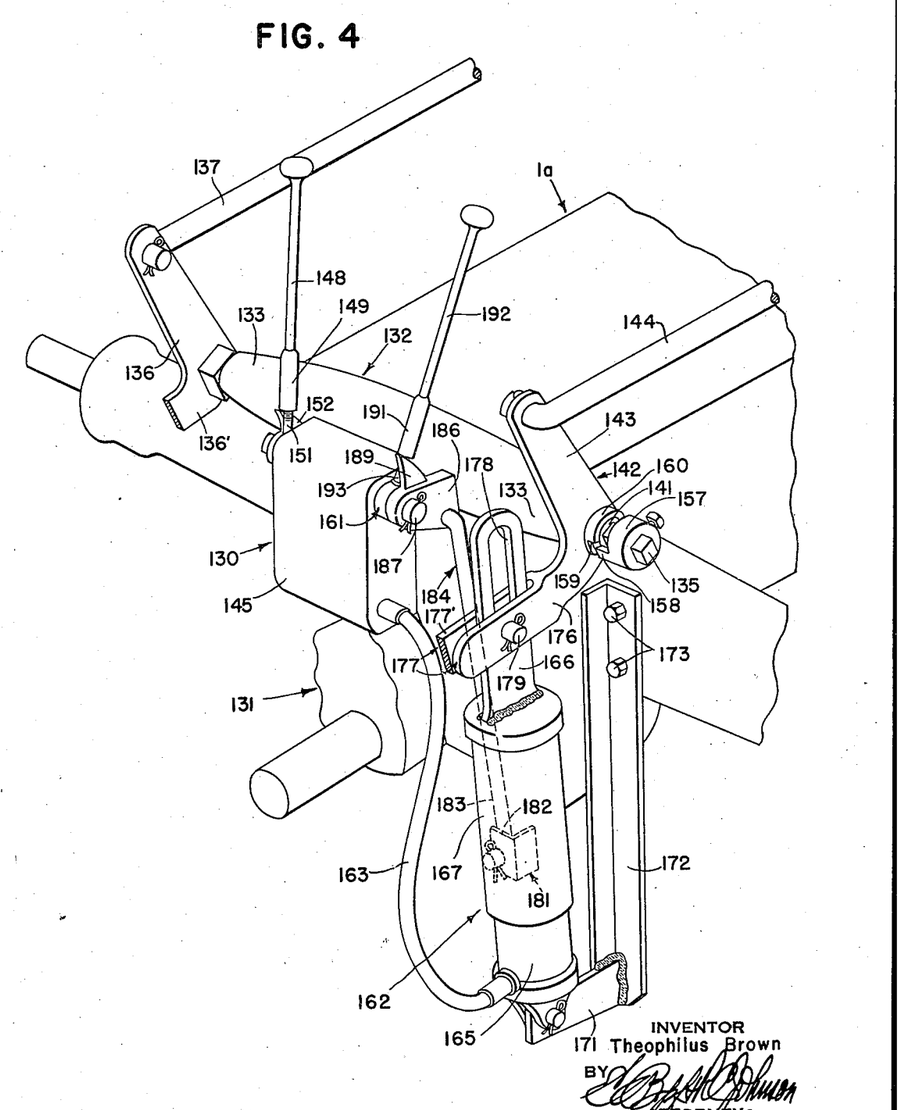
Figure 4 is a perspective view of the rear portion of a tractor equipped with the modified form of the present invention in which only one auxiliary ram unit is employed, instead of two as in the form of the invention shown in Figure 1.

Figure 4 illustrates a modified form of the present invention which comprises a main hydraulic power lift unit adapted to raise a pair of operating members, such as cultivators or other tools simultaneously or may be optionally arranged to actuate them independently, through a single auxiliary hydraulic unit. In Figure 4 the tractor is indicated at 1a and is equipped with a hydraulic power unit indicated in its entirety by the reference numeral 130. The details of the power lift unit 130 do not per se form a part of the present invention. This unit is substantially identical with the power lift unit disclosed and claimed in the co-pending application of Wayne H. Worthington, Serial No. 453,907, filed August 6, 1942. It will therefore not be necessary to completely describe the unit 130 except to say that a gear pump 131 serves as a source of fluid under pressure for delivering oil under control of suitable valve mechanism to a cylinder and piston or ram unit arranged similar to the power lift mechanism shown in the prior United States patent to E. McCormick et al., No. 2,107,760, dated February 8, 1938, to which reference may be made if necessary. The piston of such a unit is connected through an arm to a transverse rockshaft which, as best shown in Figure 4, is mounted for rocking movement in a housing 132 having lateral extensions 133, the outer ends of the rockshaft, which is indicated by the reference numeral 135, being preferably square or of other polygonal section. In the form of the invention shown in Figure 4, an arm 136 is fastened directly to the left end of the rockshaft 135 and the upper end of the arm 136 is apertured to receive the rear end of a cultivator push pipe 137. The right end of the power lift shaft 135 carries a bushing 141 on which a bell crank 142 is mounted for rocking movement relative to the rockshaft 135. The upwardly extending arm 143 pivotally receives the rear end of a right hand cultivator push pipe 144. An extension 136' on the arm 136 connects to the rear rig.

The valve mechanism which controls the rocking of the shaft 135 is disposed in a case 145 and is constructed along the lines of the valve mechanism shown in Figure 3 and in the above-mentioned Worthington co-pending application. Briefly, such valve mechanism incorporates means that causes fluid to be directed under pressure into the cylinder in which the piston controlling the rockshaft 135 is movable, merely by moving a hand lever, such as the one indicated at 148 in Figure 4, forwardly. This lever 148 includes a sleeve section 149 having screw-threaded engagement with an arm 151 that is connected directly to and forms a part of the above-mentioned valve mechanism. A return cam 152 is pivotally mounted in the case 145 and is operatively connected with the piston so that as the latter is moved in a direction to rock the lift shaft 135 in a clockwise direction, as viewed in Figure 4, the cam 152 swings rearwardly away from the lower edge of the sleeve 149 of the lever 148. When it is desired to permit the cultivator tools or other tools to lower, the valve mechanism is such that moving the valve lever 148 rearwardly from its neutral position causes the fluid to flow from the cylinder to a reservoir, which permits the piston connected with the rockshaft 135 to move forwardly under the action of the weight of the tools or other parts connected with the arms 136 and 142. As the piston thus moves forwardly, the cam member 152 also moves forwardly until, at an adjustable point, the cam member 152 engages the sleeve 149, positively returning the lever 148 to a neutral position. When the lever 148 is in a neutral position, the valve mechanism is such that the fluid is locked in the cylinder and the pump 131 is permitted to discharge directly under low pressure into the reservoir. Thus, the position of adjustment of the sleeve 149 generally vertically on the arm 151 determines the point at which the cam 152 automatically returns the lever 148 to neutral position, thus automatically determining the lowered position of the tools.

According to the principles of the present invention this rocking movement of the lift shaft 135 may be employed for swinging both of the members 136 and 142, or only one of them, as desired. To this end, I mount a set screw collar 157 on the right end of the lift shaft 135. The set screw collar 157 is provided with a lug 158 that is adapted to enter a notch 159 formed on the hub 160 of the bell crank 142 when the set screw collar 157 is loosened and moved laterally inwardly. In the position shown in Figure 4, the set screw collar 157 is fixed to the lift shaft 135 in an outer position in which the lug 158 clears the notched hub 160 of the bell crank 142. In this position, therefore, the hydraulic unit controlled by the lever 148 and which rocks the lift shaft 135 controls only the left hand lifting member 137. However, both the arms 136 and 142, and hence both of the lifting members 137 and 144, may be actuated by the single valve control lever or handle 148, merely by moving the set screw collar 157 into engagement with the hub of the bell crank 142.

The hydraulic mechanism 130, mentioned above, the details of which I do not claim as a part of this invention, includes a second valve mechanism also enclosed in the case 145 and controlled by a valve lever 161. This valve lever 161, like the lever 148, has three positions, a neutral position in which the pump 131 discharges under low pressure into a sump or reservoir, a second or rearward position in which fluid is directed under pressure from the pump 131 into an auxiliary ram unit, such as the one indicated in its entirety by the reference numeral 162 in Figure 4, connection being established by a flexible hose 163, and the valve member 161 is movable into a third position in which fluid is permitted to flow from the ram unit 162 back into the sump or reservoir. The ram unit 162 includes the usual cylinder 165 in which a piston (not shown) is mounted for movement and which is fixed to the inner end of a piston rod which is extended, as at 166, and to which a cover or sleeve 167 is fixed.

According to the principles of the present invention, I mount the auxiliary piston and cylinder or ram unit 162 on a bracket 171 that is fixed to the lower end of an angle member 172 which may be bolted, as at 173, to attaching studs on the rear axle housing of the tractor 1a. The bell crank 142 has a rearwardly extending arm 176 which is bifurcated, as at 177, so as to receive the upper end of the piston rod member 166. This end is slotted, as at 178, and through the slot is a pin 179 that connects the bell crank 142 with the ram unit 162. An extension 177' connects the part 142 to the rear rig.

In the above-mentioned co-pending Worthington application, the valve mechanism for the auxiliary ram unit is not automatically controlled according to the movement of the part with which the valve mechanism is associated. In order to provide an automatic control for the auxiliary ram unit 162, on the laterally inner side of the sleeve 167 I dispose a bracket 181, suitably fixed to the sleeve 167, and having a part 182 apertured to receive the lower end 183 of an upwardly extending link 184. The upper end of the link 184 is turned laterally inwardly and is pivoted to an arm 186 that is swingably mounted on a shaft 187 forming a part of the mechanism 130 and which includes an upwardly extending cam or stop member 189. The latter member is disposed in the path of movement of the lower end of a sleeve 191 which forms the lower part of a valve operating handle 192 and which is screw-threaded onto a section 193 of the valve operating member 161.

The operation of this form of the invention is substantially as follows.

As mentioned above, when the set screw collar 157 is disposed in the position shown in Figure 4, the main hydraulic lift mechanism 130, under the control of the lever 148, actuates the rockshaft 135 and moves only the arm 136 and the tool lifting member 137, the bell crank 142 associated with the other tool lifting member 144 being free from the lifting shaft 135. The bell crank 142 is, however, under the control of the valve means actuated by the lever 192. The valve mechanism is such that moving the lever 192 forwardly will cause fluid under pressure to be directed through the hose 163 into the cylinder 165. As the pump 131 continues to force oil into cylinder 165, the piston therein moves upwardly, forcing the piston rod 166 upwardly, thereby raising the pin 179 and the arm 176. This swings the bell crank 142 in a clockwise direction (Figure 4) and thus moves the tool lifting member 144 forwardly. As the piston rod 166 moves upwardly, the link 184 also moves upwardly, which movement swings the member 186 in a counterclockwise direction, the cam section 189 moving rearwardly. The upward movement of the piston in the ram unit 162 and the raising movement of the tool is terminated by moving the hand lever 192 back to its neutral position. When it is desired to lower the tool associated with the lifting member 144, the operator moves the hand lever 192 rearwardly. This releases the fluid hydraulically locked in the ram unit 162, the weight of the tool or associated spring means serving to rock the bell crank 142 in a counterclockwise direction, thus forcing oil out of the cylinder 165 and back through the hose 163 into the reservoir. As the piston moves inwardly of the cylinder 165, the link 164 is lowered, which swings the cam 189 forwardly until at a point when it engages the sleeve 191, a slight additional downward movement of the link 184 acts through the cam 189 to return the hand lever 192 from its rearward or lowering position back into its neutral position. The point at which this automatic return occurs may be adjusted by turning the lever 192 on the arm extension 193, in substantially the same manner as the position of the hand lever 148 is adjusted on the arm 151. Thus, the disposition of the members 148 and 192 on the respective arms 151 and 193 serve automatically to return the valves to neutral position when the lifting members 137 and 144 reach a predetermined lowered position, the position of each may be adjusted as desired. It is also possible to terminate the lowering movement at any time desired merely by manually moving the associated lever, 148 or 192, forwardly from a rearward position into a neutral position.

When it is desired to operate both of the arms 136 and 142 by the same control member or by one control member, the set screw collar 157 is moved inwardly with its lug 158 interengaged with the notch 159 on the hub 160 of the member 142. Then by operating the lever 148, both of the arms 136 and 142 are moved forwardly or rearwardly according to the motion imparted to the lift shaft 135. In this event the auxiliary ram unit 162 is, in effect, disconnected from the arm 142, since the pin 179 merely moves upwardly in the slot 178 when the arm 142 is rocked forwardly by the clockwise motion of the lift shaft 135. The auxiliary unit 162 is of advantage, however, even when the set screw collar 157 connects the arm 142 with the rockshaft 135. Assume, for example, that it may be desired, for some reason, to stop the lowering movement of both tools at a point above the point at which the cam member 152 would terminate the lowering movement, but that it is not desired to disturb the setting of the lever 148. In that event, after the tools have been raised, the operator may extend the ram unit 162 by pushing the hand lever 192 forwardly and holding it in that position until the piston has been moved upwardly the desired amount. Then the hand lever 192 will be moved backwardly to a neutral position, hydraulically locking the ram unit 162 in that position. This will then serve as a stop for the pin 179 when both of the arms 136 and 142 are permitted to move rearwardly by moving the hand lever 148 into its rearward position. Thus, the ram unit 162 serves as an adjustable temporary stop for both of the arms 146 and 142, providing the set screw collar 157 is engaged with the member 142, without disturbing the adjustment of the member 148 on the arm 151, which normally determines the point at which the tools associated with both members 137 and 144 are stopped in their lowering movement.

Figures 5, 6, 7:
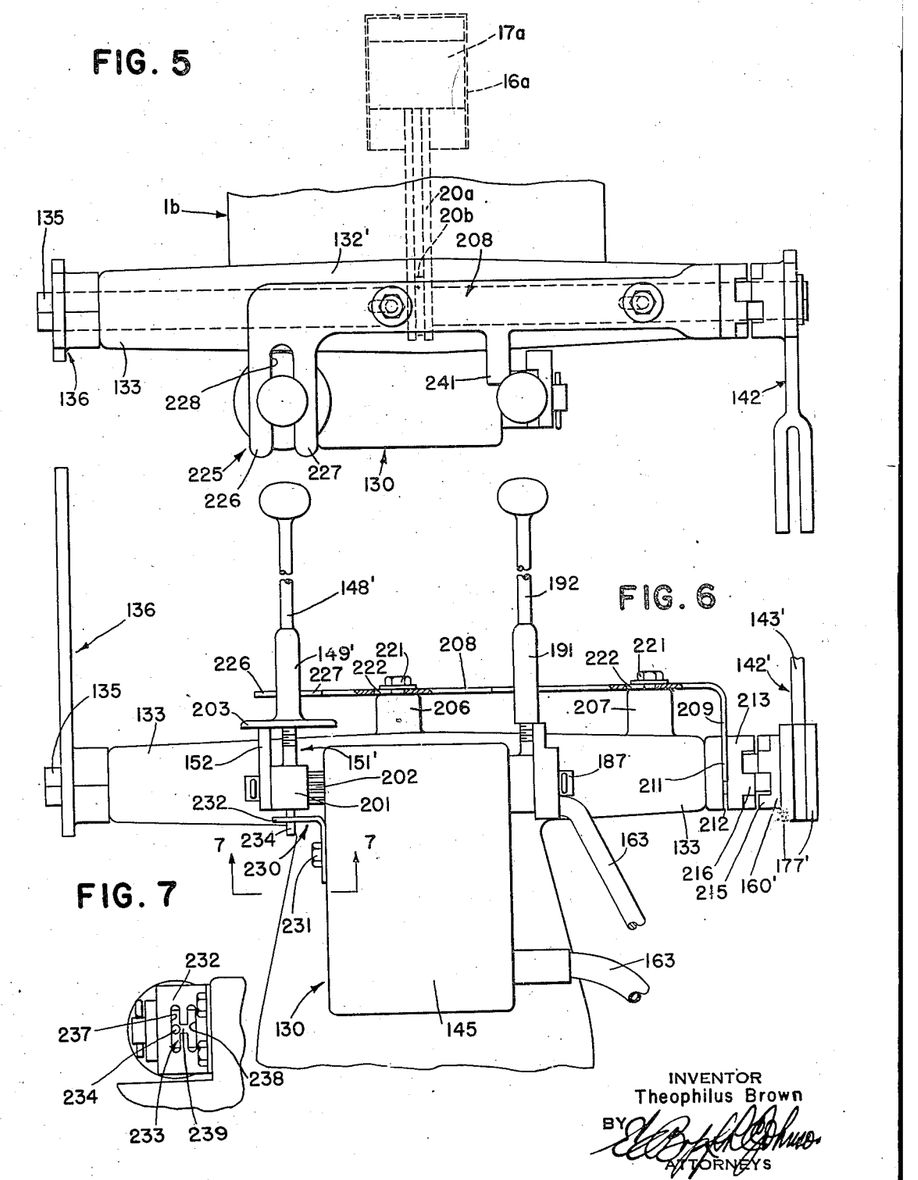
Figure 5 is a fragmentary plan view of another form of the present invention.
Figure 6 is a rear view of the construction shown in Figure 5.
Figure 7 is a fragmentary view taken along the line 7—7 of Figure 6.

In the form of the invention shown in Figure 4, in order to disconnect the arm 142 from and connect the same to the rockshaft 135, it is necessary to manually loosen the set screw of the collar 157 and shift the same by hand from one position to another. In Figures 5 and 6 I have shown an arrangement wherein the main valve lever is given a lateral movement and that movement made use of for shifting a collar or clutch member, slidable but non-rotatable on the power lift rockshaft, into and out of engagement with the auxiliary bell crank or lifting arm member.

Referring now more particularly to Figures 5 and 6, those parts in the form of invention shown in Figures 5 and 6 that are identical with the parts in the form of the invention shown in Figure 4 will be indicated by the same reference numerals for clarity. In this form of the invention the arm 151' is mounted on a hub 201 that is splined on a part 202 that extends from the valve box of the central mechanism 130 and is connected to the parts therein in the same manner that the part 151 is connected in Figure 4. The hub 201 is freely slidable on the splines of the member 202. The threaded portion of the arm 151 receives the sleeve section 149' of a hand lever 148', and the lower portion of the sleeve portion 149' is provided with a relatively large flanged portion 203 which is disposed above and adapted to engage a cam or stop member 152' which is connected with the main piston in the same manner as the cam or stop member 152 in Figure 4.

The upper part 132' of the power lift housing is provided with a pair of upwardly extending lugs 206 and 207 on which a laterally shiftable slide 208 is mounted. The laterally outer end of the slide 208 is extended downwardly to form a fork 209 having ends 211 disposed in a groove 212 formed in a shiftable clutch member 213. Preferably, the clutch member 213 has a square opening fitting over the right end of the power lift rockshaft 135. The bell crank 142' having an upwardly extending arm section 143' and a rearwardly extending bifurcated end 177' is provided with a hub 160' which is formed with clutch teeth 215 that cooperate with similar teeth 216 formed on the clutch member 213. The bell crank 142' is mounted for rocking movement on a bushing or the like supported on the right end of the rockshaft 135, but when the clutch member 213 is shifted to the right as viewed in Figure 6, the teeth 216 engage the teeth 215, with the result that the bell crank member 142' is locked to rock with the rockshaft 135. The slide 208 is supported on the lugs 206 and 207, and the latter are tapped to receive cap screws 221 that extend through slots 222 formed in the slide 208 for defining and limiting its movement. The slide member 208 is also provided with a forked section 225 (Figure 5), the ends 226 and 227 of which are disposed on opposite sides of the sleeve 149', the section 225 including a slot 228 which is of sufficient length to permit the valve lever 148' to have the necessary fore and aft movement, yet the member 208 moves laterally when the lever 148' is shifted laterally on the splined shaft 202.

As best shown in Figure 7, a gate member 230 is fixed to the left side of the valve box 145, as by a cap screw 231, and the gate member 230 includes a horizontal section 232 which, as best shown in Figure 7, is provided with an H-shaped opening 233 in which a lug 234 formed on the slidable hub 201 is disposed. The opening 233 provides two longitudinal slots 237 and 238 spaced apart laterally but joined by a central passage 239. Thus, when the lug 234 is in the laterally outer slot 237, the lever 148' may be moved forwardly or rearwardly from its neutral position without restraint, and the lever 148', after being returned to a neutral position, may be shifted laterally inwardly, the lug 234 passing through the transverse slot 239 into the slot 238, after which the hand lever 148' may be shifted fore and aft from a neutral position. This lateral movement, as will be apparent from Figure 5, acts through the forked section 225 of the slide 208 to shift the clutch collar 213 into and out of engagement with the hub 160' of the lifting bell crank 142. In other words, the valve mechanism associated with the lever 148' may be moved into raised or lowering position, either with the valve lever 148' in a laterally outer position, as shown in Figures 5–7, or in a laterally inner position, in which the clutch collar 213 is in engagement with the lifting bell crank 142. This makes it convenient to raise or lower either or both of the sets of tools connected respectively with the lifting members 136 and 142' merely by shifting the control lever 148' laterally from one position into the other, thus making it unnecessary to dismount from the tractor and loosen the set screw collar 157, as in the form of the invention shown in Figure 4. Since the movement of the lug 234 (Figure 7) is restricted either to movement in the slot 237 or the slot 238, there is no possibility of operating the lever 148' with the clutch 213, 160' being only partially engaged.

In some situations it may not be desirable to have the auxiliary control lever 192 in a position to be operated, especially in the raising direction, when the bell crank 142' is connected with the rockshaft 135. In order to provide means for preventing the raising movement of the lever 192, I provide an extension or lug 241 (Figure 5) on the slide 208, the same being in a position so that when the slide 208 is moved to the right (Figure 5) to engage the clutch collar 213 with the hub 160', the lug 241 moves into a position in front of the sleeve section 191 of the lever 192, thus holding the lever 192 against being moved forwardly or into its raising position. Movement of the hand lever 192 into its lowering position would, of course, have no effect upon the rockshaft 135 and the arms 136 and 142'.

The motor of the tractor, 1a or 1b, of Figures 4–7, is or may be operated as a constant speed device by suitable governor mechanism conventionally installed on farm tractors, and therefore the pump 131 is a means for supplying a constant volume of oil under pressure per unit time. The power lift mechanism shown in Figures 4–7, as mentioned above, embodies a piston and cylinder unit similar to that shown in the above mentioned patent to E. McCormick et al. Briefly, such unit is arranged as a piston and cylinder unit shown in Figure 2, with a cylinder 16a and a piston 17a carried on the tractor, the piston 17a being connected to the rockshaft 135 (Figures 4 and 5) by a link 20a to an arm 20b fixed to the rockshaft 135. This arrangement is shown diagrammatically in Figure 5 and the construction shown in Figure 4 embodies substantially the same arrangement.

Since the oil pump is driven at a constant speed and is of the positive displacement type, there is available for lifting purposes an amount of oil that is constant per unit time. The valve mechanism, as has been described, is so arranged that the two controlling arms 136 and 142 may be operated by the one piston and cylinder unit 16a, 17a, or they may be operated separately by the disconnection of the clutch members 157, 160 (Figure 4) or the clutch elements 215, 216 (Figure 6), in which case the left hand arm 136 is controlled by the piston and cylinder unit 16a, 17a and the right hand arm 142 is controlled by the piston and cylinder unit 162. These two piston and cylinder units are of approximately the same volumetric capacity, and therefore when both arms 136 and 142 are connected to be rocked by the rockshaft 135 and the piston unit 16a, 17a, they are moved from one position to the other in substantially the same length of time in which the arms are separately moved by the units 16a, 17a and 162, respectively. Thus, according to the present invention, there is no loss of time involved in raising or lowering the tools together as compared with raising or lowering them separately.

While I have shown and described above the preferred structure in which the principles of the present invention have been incorporated, it is to be understood that my invention is not to be limited to the particular means shown and described, but that, in fact, widely different means may be employed in the practice of the broader aspects of my invention.

What I claim, therefore, and desire to secure by Letters Patent is:

1. The combination with a tractor having a power lift, including a source of fluid pressure, a ram unit actuated thereby, and an implement controlling member driven by said ram unit, of an auxiliary ram unit actuated by said fluid pressure, and a one-way connection between said auxiliary ram unit and said implement controlling member whereby the latter may also be driven by said auxiliary ram unit.

2. In combination, an implement-carrying support, a pair of implement units connected therewith, one unit at each side thereof, a pair of fluid expansible means, one connected with one unit and the other with the other unit, means of supplying fluid to said expansible means so as to controllably move one implement unit relative to the other, and separate means for raising both implement units relative to said support.

3. The combination of a tractor having a power lift, including a source of fluid pressure, a ram unit actuated thereby, a rockshaft on said tractor operatively connected with said ram unit, a lifting arm rockable on said rockshaft, means on said rockshaft for rocking said lifting arm, an auxiliary ram unit actuated by said fluid pressure, and means connecting said auxiliary ram unit with said lifting arm for rocking the latter independently of said rockshaft.

4. The combination with a tractor having a fluid pump, two implement means carried on the tractor, a pair of ram units actuated by said fluid pump mounted on the tractor and adapted to be connected, respectively, with said two implement means, means for selectively operating said ram units so as to selectively adjust said two implement means, and means for connecting both of said implement means with one of said ram units, whereby to shift both of the implement means simultaneously by operating said one ram unit.

5. The combination with a tractor having a fluid pump of the positive displacement constant speed type, two implement means carried on the tractor, a pair of ram units actuated by said fluid pump mounted on the tractor and adapted to be connected, respectively, with said two implement means, means for selectively operating said ram units so as to selectively adjust said two implement means, and means for connecting both of said implement means with one of said ram units, whereby to shift both of the implement means simultaneously and at the same speed as the separate adjustment of said implement means.

6. The combination with a tractor having a fluid pump, two implement means carried on the tractor, a pair of ram units actuated by said fluid pump mounted on the tractor and adapted to be connected, respectively, with said two implement means, means for selectively operating said ram units so as to selectively adjust said two implement means, means for connecting both of said implement means with one of said ram units, whereby to shift both of the implement means simultaneously by operating said one ram unit, and means for locking the other ram unit against operation when said one ram unit is connected to shift both implement means.

7. The combination with a tractor having a fluid pump of the positive displacement constant speed type, a pair of implement units, a pair of ram units actuated by said fluid pump connected respectively with said implement units, means for connecting one ram unit with both of said implement units for operating the latter in a certain period of time, and means for operating either of said ram units and the associated implement unit in substantially the same length of time.

8. An agricultural machine comprising a pair of implement units, a pair of ram units, means for connecting the latter units, respectively, with said implement units, and means for disabling one ram unit and connecting the other with both of said implements.

9. An agricultural machine comprising a pair of implement units, a pair of ram units, a separate control lever for each ram unit, each of said control levers having movement in valve-operating direction and one of said control levers having supplemental movement from one position to another, and mechanism operated by movement of said one control lever from one of said last mentioned positions to the other and by subsequent movement of said one control lever in a valve-operating direction for causing both of said implement units to be operated simultaneously.

10. A tractor power lift mechanism comprising a pair of lifting members, a pair of power operated units, means for permanently connecting one of said units with one of said members, means for optionally connecting the other lifting member with said one unit, and means for operatively connecting said other unit with said other lifting member when the latter is disconnected from said one unit.

11. Power lift mechanism for a tractor having a source of fluid pressure thereon and an implement connected therewith and having parts to be shifted, comprising a main ram unit actuated by said fluid pressure connected to operate one of said implement parts, an auxiliary ram unit flexibly connected with the tractor and deriving operating energy from said source, and means connecting said auxiliary ram unit with another of said implement parts.

12. A tractor power lift comprising a rockshaft, a pair of implement controlling members mounted on said rockshaft, one being fixed to said rockshaft to be moved thereby, the other being capable of movement independent of said rockshaft, and optionally operable means for connecting said other member also with said rockshaft to be moved thereby.

13. A tractor power lift comprising a rockshaft, a pair of implement controlling members mounted on said rockshaft, one being fixed to said rockshaft to be moved thereby, the other being capable of movement independent of said rockshaft, a part rockable with said rockshaft adjacent said other implement controlling member, and means for optionally connecting said part with said other member.

14. A tractor power lift comprising a rockshaft, a pair of implement controlling members mounted on said rockshaft, one being fixed to said rockshaft to be moved thereby, the other being capable of movement independent of said rockshaft, a collar slidable but non-rotatable on said rockshaft, and cooperating parts on said collar and said other implement controlling member whereby in one position said collar serves to cause said other member to be moved by said rockshaft and whereby in the other position of said collar said rockshaft is capable of movement relative to said other member.

15. The combination with a tractor adapted to receive a pair of implement units and including a source of fluid pressure, a pair of power lift units connected with said source of pressure and adapted to derive power therefrom, means connecting said power lift units with the respective implement units for raising and lowering them, means for selectively operating said power lift units so as to selectively adjust said implement units, and means for disabling one of said power lift units and connecting the implement unit normally associated therewith with the other power lift unit, whereby the operation of the latter adjusts both implement units.

16. An agricultural machine comprising a tractor having a power lift rockshaft, a pair of front implement units disposed on opposite sides of the tractor, rear implement means connected with the rear of the tractor, a pair of separately operable ram units, means connecting one of said front implement units with the rockshaft to be controlled thereby, means connecting one of said ram units to rock said rockshaft connected with the other front implement means, a bell crank mounted on said rockshaft for rocking movement relative thereto, means connecting said bell crank with the other of said ram units, means shiftable laterally on the rockshaft for optionally connecting the bell crank with said rockshaft, so as to rock with the latter when the latter is operated by said first ram unit, said bell crank being operated by said second ram unit when said shiftable means disengages said bell crank from said rockshaft, and means connecting said rear implement means to be operated by said bell crank.

17. In a mechanism of the class described, a pair of power devices, separately movable controlling members, one for each of said power devices and each of said movable controlling members being movable in a given direction for controlling the associated power device, one of said controlling members being movable into two different positions, movement of said one controlling member in each of said positions serving to control the associated power device, and means responsive to the movement of said one controlling member into one of said positions for governing the other controlling member.

18. The combination of a tractor having a rear axle and a hydraulic power lift including a transverse rockshaft rockably mounted adjacent said rear axle and a source of fluid pressure operatively connected to rock said rockshaft, a pair of lifting bell cranks mounted for movement relative to said rockshaft, a pair of arms fixed to said rockshaft and having portions engageable, respectively, with said bell cranks whereby both of the latter may be moved in one direction by rocking movement of said rockshaft in one direction, a pair of independent hydraulic piston and cylinder units mounted on said rear axle and including means deriving energy from said source of fluid pressure and valve means normally biased for movement into a neutral position, and a pin and slot connection between each of said piston and cylinder units of the associated bell crank, whereby either of said units may be utilized as a means for moving the associated bell crank in one direction and may also be utilized as a stop limiting the movement of the associated bell crank in the other direction.

19. A tractor comprising a power operated hydraulic unit, a transverse rockshaft adapted to be rocked in at least one direction by said power unit, operating members having a one-way connection with said transverse rockshaft whereby movement of the latter in one direction actuates said members, and a pair of hydraulic units for separately controlling said members.

20. A tractor comprising a power operated hydraulic unit, a transverse rockshaft actuated by said unit, a pair of bell cranks loosely mounted on the ends of said rockshaft, means carried by the latter and engaging said bell cranks for moving them together in one direction, a pair of individual hydraulic units, one for each of said bell cranks, means connecting each of said pair of hydraulic units with the associated bell crank for controlling the movement of the latter independently of said rockshaft, and separate means for operating said pair of hydraulic units.

21. An agricultural machine comprising a transverse shaft, a bell crank loosely mounted at each end of said shaft, means on the latter for swinging both of said bell cranks in one direction when said transverse shaft is rocked in that direction, means for rocking said shaft in said direction, and a pair of hydraulic units individually connected with said bell cranks optionally moving either of said bell cranks in said one direction.

22. An agricultural machine comprising a transverse shaft, a pair of lifting members loosely connected with the ends of said shaft, means for rocking said shaft through a given displacement in one direction, arms on said shaft and engageable, respectively, with said lifting members for moving both of the latter in said one direction, and means including a pair of separate hydraulic units for individually controlling the movement of each lifting member independently of the other lifting member in the other direction.

23. An agricultural machine comprising a transverse rockshaft, a pair of lifting members rockably mounted on said rockshaft for movement relative thereto, a hydraulic unit for rocking said rockshaft in one direction, a pair of arms fixed to said rockshaft and associated, respectively, with said lifting members whereby rocking movement of said rockshaft actuates both of said lifting members, and a pair of individually controllable auxiliary units connected to derive energy from said hydraulic unit and operative to control said lifting members independently of each other and of said rockshaft.

24. The combination with a tractor having a power actuated hydraulic unit and a transverse rockshaft operatively connected with said unit to be rocked thereby from one position to another, of a pair of lifting members loosely mounted on said rockshaft, means on the latter whereby movement of said rockshaft from one position to another actuates both of said lifting members, and means deriving energy from said unit for individually controlling the return position of said lifting members, respectively.

25. The combination of a tractor having a hydraulic power lift including a transverse rockshaft and a source of fluid pressure, a pair of lifting members loosely mounted on said rockshaft for movement independently thereof, a pair of arms on said rockshaft engageable, respectively, with said members whereby the latter may be moved together in one direction by movement of said rockshaft in one direction, a pair of adjustable stops respectively limiting movement of said members in the other direction, and separately controlled means deriving energy from said source of pressure for controlling said stops.

26. The combination set forth in claim 25, further characterized by each of said last mentioned means including a controlling valve lever and resilient means biasing said lever for movement from either direction into a neutral position in which the associated stop is held in position.

27. The combination of a tractor having a hydraulic power lift including a transverse rockshaft and a source of fluid pressure, a lifting member loosely mounted on said rockshaft, means on the rockshaft engageable with said member whereby the latter is moved in one direction by movement of the rockshaft in one direction, an adjustable stop limiting movement of said member in the other direction, and means deriving energy from said source of pressure for controlling said stop.

28. The combination of a tractor having a power take-off shaft, a rear axle and a hydraulic power lift including a transverse rockshaft rockably mounted adjacent said rear axle and a hydraulic pump operated by said power take-off shaft and operatively connected to rock said rockshaft, a pair of lifting bell cranks mounted for movement relative to said rockshaft, a pair of arms fixed to said rockshaft and having portions engageable, respectively, with said bell cranks whereby both of the latter may be moved in one direction by rocking movement of said rockshaft in one direction, a pair of independent hydraulic piston and cylinder units mounted on said rear axle, a separate hydraulic pump operated by said power take-off shaft for actuating said units, and separate valve means controlling the flow of fluid to said units from said second hydraulic pump.

29. The combination of a tractor having a rear axle and a hydraulic power lift including a transverse rockshaft rockably mounted adjacent rear axle and a source of fluid pressure operatively connected to rock said rockshaft, a pair of lifting bell cranks mounted for movement relative to said rockshaft, a pair of arms fixed to said rockshaft and having portions engageable, respectively, with said bell cranks whereby both of the latter may be moved in one direction by rocking movement of said rockshaft in one direction, a pair of independent hydraulic piston and cylinder units mounted on said rear axle, and means for operating said units.

30. In an agricultrual machine, a tractor having a source of hydraulic power, a pair of implement controlling parts movably mounted on the tractor, a pair of hydraulic piston and cylinder units fixed to the tractor and operatively connected with said implement controlling parts, and a pair of valves for individually controlling said units, each movable into three positions and including a part biased for movement out of either of two positions into a neutral position.

31. A tractor power lift comprising a rockshaft, a pair of implement controlling members mounted on said rockshaft, one being fixed to said rockshaft to be moved thereby, the other being capable of movement independent of said rockshaft, optionally operable means for connecting said other member also with said rockshaft to be moved thereby, and means for operating said other member when it is movable relative to said rockshaft.

32. A tractor power lift comprising a rockshaft, a pair of implement controlling members mounted on said rockshaft, one being fixed to said rockshaft to be moved thereby, the other being capable of movement independent of said rockshaft, optionally operable means for connecting said other member also with said rockshaft to be moved thereby, and means including a hydraulic ram unit connectible with said other member when it is movable relative to said rockshaft for operating said other member.

33. The combination with a tractor having a power lift, including a source of fluid pressure, a ram unit actuated thereby, and an implement controlling member driven by said ram unit, of an auxiliary ram unit actuated by energy derived from the tractor, and a one-way connection between said auxiliary ram unit and said implement controlling member whereby the latter may also be driven by said auxiliary ram unit.

34. The combination with a tractor, two implement means carried on the tractor, a pair of ram units mounted on the tractor and adapted to be connected, respectively, with said two implement means, pump means for actuating said ram units, means for selectively operating said ram units so as to selectively adjust said two implement means, and means for connecting both of said implement means with one of said ram units, whereby to shift both of the implement means simultaneously by operating said one ram unit.

35. A tractor power lift mechanism comprising a rockshaft, a first power means for rocking said rockshaft, a member adapted for movement relative to said rockshaft, power means for actuating said member, and means for optionally connecting said member with said rockshaft.

36. A tractor power lift mechanism comprising a rockshaft, a first power means for rocking said rockshaft, mechanism including a movable part for controlling said power means, a member adapted for movement relative to said rockshaft, power means for actuating said member, means for optionally connecting said member with said rockshaft, and means for operating said optional connecting means from said part.

37. In an agricultural machine, a pair of implement shifting members, power means operable to shift one of said members, mechanism including a movable part for controlling said power means, and means controlled by movement of said part for optionally connecting the other of said members with said one member, whereby operation of said power means actuates both of said implement shifting parts.

38. In an agricultural machine, a pair of implement shifting members, power means operable to shift one of said members, mechanism including a movable part for controlling said power means, means controlled by movement of said part for optionally connecting the other of said members with said one member, whereby operation of said power means actuates both of said implement shifting parts, and separate power means for operating said other implement shifting member when the latter is unconnected with said one member.

39. In an agricultural machine, a pair of implement shifting members, power means operable to shift one of said members, mechanism including a movable part for controlling said power means, said movable part being shiftable between two positions for controlling said power means and also shiftable into either of two other positions, and means controlled by movement of said part from one to the other of said last mentioned positions for optionally connecting the other of said members with said one member, said part being movable into either of said first two positions from either of said other positions.

40. In a tractor power lift, a casing, a rockshaft journaled therein, controllable power means for rocking said rockshaft, a pair of implement-shifting members mounted on said rockshaft, one being fixed thereto, means for optionally connecting the other implement-shifting member to said rockshaft, an operating part for controlling said power means, and means movably mounted on said casing for connecting said part with said optional connecting means.

41. In an agricultural machine having a source of power, a pair of tool moving members, power means deriving power from said source for moving both of said members at the same time, and separate power means also deriving power from said source for moving said members individually.

42. In an agricultural machine having a source of power, tool controlling means, power operated means deriving power from said source for operating said tool controlling means in one direction, and power operated means also deriving power from said source for limiting the movement of the tool controlling means in the other direction.

43. A tractor comprising a power operated hydraulic unit, a transverse rockshaft adapted to be rocked in at least one direction by said power unit, operating members having a one-way connection with said transverse rockshaft whereby movement of the latter in one direction actuates said members, and a pair of hydraulic units for separately controlling said members.

44. The combination of a tractor having a rear axle and a hydraulic power lift including a transverse rockshaft rockably mounted adjacent said rear axle and a source of fluid pressure operatively connected to rock said rockshaft, a pair of lifting bell cranks mounted for movement relative to said rockshaft, a pair of arms fixed to said rockshaft and having portions engageable, respectively, with said bell cranks whereby both of the latter may be moved in one direction by rocking movement of said rockshaft in one direction, a pair of independent hydraulic piston and cylinder units mounted on said rear axle and including means deriving energy from said source of fluid pressure and valve means normally biased for movement into a neutral position, and a pin and slot connection between each of said piston and cylinder units of the associated bell crank, whereby either of said units may be utilized as a means for moving the associated bell crank in one direction and may also be utilized as a stop limiting the movement of the associated bell crank in the other direction.

45. A tractor comprising a power operated hydraulic unit, a transverse rockshaft adapted to be rocked in at least one direction by said power unit, operating members having a one-way connection with said transverse rockshaft whereby movement of the latter in one direction actuates said members, and means for separately controlling said members.

46. A tractor comprising a power operated hydraulic unit, a transverse rockshaft actuated by said unit, a pair of bell cranks loosely mounted on the ends of said rockshaft, means carried by the latter and engaging said bell cranks for moving them together in one direction, and means for separately controlling said bell cranks.

47. The combination of a tractor having a hydraulic power lift including a transverse rockshaft and a source of fluid pressure, a pair of lifting members loosely mounted on said rockshaft for movement independently thereof, a pair of arms on said rockshaft engageable, respectively, with said members whereby the latter may be moved together in one direction by movement of said rockshaft in one direction, and a pair of adjustable stops respectively limiting movement of said members in the other direction.

48. The combination with a tractor having a power actuated hydraulic unit and a transverse rockshaft operatively connected with said unit to be rocked thereby from one position to another, of a pair of lifting members loosely mounted on said rockshaft, means on the latter whereby movement of said rockshaft from one position to another actuates both of said lifting members, and means for individually controlling the return position of said lifting members, respectively.

49. A tractor comprising a power operated hydraulic unit, power means on the tractor for operating said unit, a transverse rockshaft connected to be rocked in at least one direction by said power unit, operating members having a one-way connection with said transverse rockshaft whereby movement of the latter in one direction actuates said members, and separate power operated means also deriving power from said power means on the tractor for separately controlling said members.

50. A tractor comprising a power operated hydraulic unit, a transverse rockshaft actuated by said unit, a pair of bell cranks loosely mounted on the ends of said rockshaft, means carried by the latter and engaging said bell cranks for moving them together in one direction, a pair of separately operable parts, one for each of said bell cranks, means connecting each of said parts with the associated bell crank for controlling the movement of the latter independently of said rockshaft, and separate means for operating said parts.

THEOPHILUS BROWN.